United States Patent
Vora et al.

(10) Patent No.: US 10,552,632 B2
(45) Date of Patent: Feb. 4, 2020

(54) DATA LOSS PREVENTION FOR AN ONLINE CONTENT MANAGEMENT PLATFORM

(71) Applicant: Dropbox Inc., San Francisco, CA (US)

(72) Inventors: Rohan Vora, Santa Clara, CA (US); Yosrie Mansour, Tel Aviv (IL)

(73) Assignee: Dropbox, Inc., San Francisco, CA (US)

( * ) Notice: Subject to any disclaimer, the term of this patent is extended or adjusted under 35 U.S.C. 154(b) by 0 days.

(21) Appl. No.: 16/403,470

(22) Filed: May 3, 2019

(65) Prior Publication Data
US 2019/0258815 A1 Aug. 22, 2019

Related U.S. Application Data

(62) Division of application No. 15/392,428, filed on Dec. 28, 2016, now Pat. No. 10,346,629.

(51) Int. Cl.
 G06F 21/62 (2013.01)
 H04L 29/06 (2006.01)
 H04L 29/08 (2006.01)

(52) U.S. Cl.
 CPC ........ *G06F 21/6218* (2013.01); *H04L 63/105* (2013.01); *H04L 63/20* (2013.01); *H04L 67/1097* (2013.01); *H04L 67/06* (2013.01)

(58) Field of Classification Search
 CPC .... G06F 21/6218; G06F 21/60; G06F 21/554; H04L 63/20; H04L 63/105; H04L 67/1097; H04L 67/06
 See application file for complete search history.

(56) References Cited

U.S. PATENT DOCUMENTS

| | | | |
|---|---|---|---|
| 8,832,780 B1 | 9/2014 | Sarin et al. | |
| 9,237,170 B2 | 1/2016 | Kiang et al. | |
| 9,990,506 B1 * | 6/2018 | Brisebois | ................ H04L 63/20 |
| 2013/0246334 A1 | 9/2013 | Ahuja et al. | |
| 2014/0026181 A1 | 1/2014 | Kiang et al. | |
| 2014/0164314 A1 | 6/2014 | Ahuja et al. | |

OTHER PUBLICATIONS

News Bites Pty Ltd, "Making Enterprises Mobile First: T-Systems offers Mobilelron Enterprise Mobility Management Solution integrated with Dynamic Workplace Services," News Bites US-NASDAQ, Melbourne, Australia, May 25, 2016, 3 pages.
PR Newswire Association LLC, "Vaultize Integrates its Enterprise File Sharing and Rights Management With Data Loss Prevention Solutions," PR Newswire Europe Including Uk Disclose, Sep. 16, 2015, 3 pages.

(Continued)

*Primary Examiner* — Amir Mehrmanesh
(74) *Attorney, Agent, or Firm* — Polsinelli PC

(57) ABSTRACT

Disclosed are systems, methods, and non-transitory computer-readable storage media for providing content management features in a messaging service. A content management system is configured to receive an update to a rule in a data loss prevention (DLP) policy, to identify, based on a log of DLP violations, one or more content items for updating content management permissions, and to update the content management permissions for the one or more content items based on the update to the rule.

14 Claims, 11 Drawing Sheets

(56) References Cited

OTHER PUBLICATIONS

Warland A., "SharePoint Online," Records about the World, Sep. 27, 2016, downloaded from https://andrewwarland.wordpress.com/category/records-management/electronic-records/products-and-applications/sharepoint-online/ on Dec. 15, 2016, 13 pages.

Andrew Warland, "SharePoint Online", Records about the world, Sep. 27, 2016 (Downloaded Dec. 15, 2016 from https://andrewwarland.wordpress.com/category/records-management/electronic-records/products-and-applications/sharepoint-online/).

"Vaultize Integrates its Enterprise File Sharing and Rights Management With Data Loss Prevention Solutions," PR Newswire Europe including UK Disclose, PR Newswire Association LLC, New York, NY, Sep. 16, 2015.

"Making Enterprises Mobile First: T-Systems offers Mobileiron Enterprise Mobility Management Solution integrated with Dynamic Workplace Services," News Bites US—NASDAQ, News Bites Pty Ltd, Melbourne, Australia, May 25, 2016.

\* cited by examiner

800

DATA LOSS PREVENTION FOR AN ONLINE CONTENT MANAGEMENT PLATFORM

CROSS-REFERENCE TO RELATED APPLICATIONS

The application is a divisional of U.S. application Ser. No. 15/392,428 filed Dec. 28, 2016, entitled "Data Loss Prevention for an Online Content Management Platform", which is hereby expressly incorporated herein by reference in its entirety.

TECHNICAL FIELD

The present disclosure relates generally to online content management services and in particular to providing data loss prevention features within a content management platform.

BACKGROUND

Online content management services allow users to access and manage content across multiple devices using the Internet. In a typical online content management service, a user establishes a content management account with the service provider and can associate various content items with the content management account. For example, online content management services may allow the user to store content items (including but not limited to text documents; email messages; text messages; other types of messages; media files such as photos, videos, and audio files; and/or folders containing multiple files). Some online content management services may allow users to set sharing options for stored content items in order to control whether and how other users are able to access the content items.

Data loss prevention (DLP) strategies are designed to address the risk of inadvertent leaks or exposure of sensitive data outside of authorized channels. Some DLP services work with content management platforms by sitting between the end user and the content management platform. On an upload, a DLP service may first obtain the content item from a user device, scan the content item, and, if permitted, upload the content item to the content management platform. On a download, the DLP service may first obtain the content item from the content management platform, scan the content item, and, if permitted, send the content item to the user device.

BRIEF DESCRIPTION OF THE DRAWINGS

The above-recited and other advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

Figure 1:
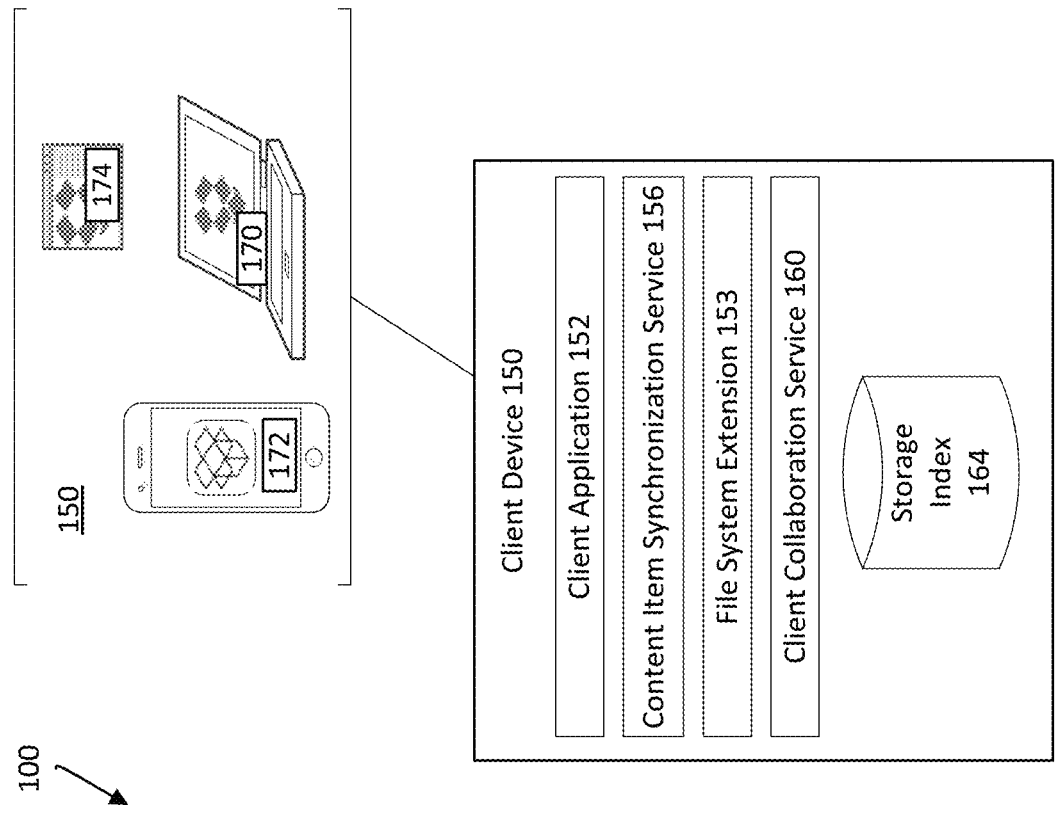
FIG. 1 shows an example of a content management system and client devices according to some embodiments.
Figure 1:
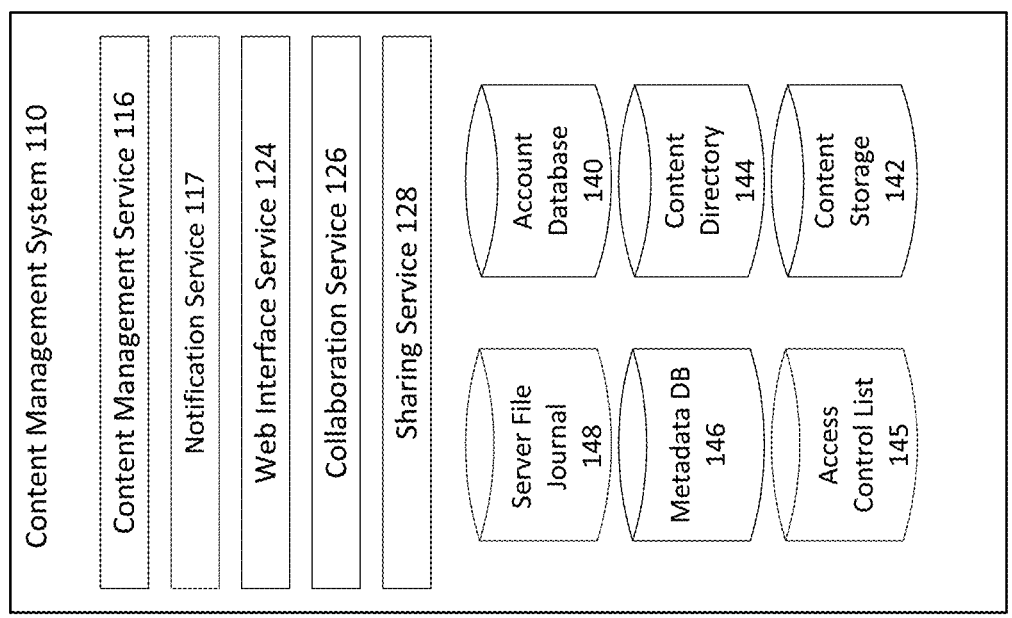

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

The disclosed technology addresses the need in the art for integrating data loss prevention (DLP) features within an online content management system. Inadvertent leaks or exposure of sensitive data has long been a threat to individuals and organizations. However, new technical problems have arisen with the advent and wide adoption of computer and internet technologies that facilitate the convenient storage and dissemination of data, especially within the context of remote content management systems accessible via a network. For example, DLP services that sit between an end user and a content management system scan content items as they are downloaded or uploaded by a user device. However, this requires that the content items be transmitted over a network and scanned by the DLP services each time a content item is uploaded or downloaded, thus increasing the strain on network bandwidth, processing, and additional delay for the end user waiting for the content item to be scanned. These computing resources are further wasted when, as a result of the scan, it is discovered that the content item is not permitted to be uploaded, downloaded, or shared.

Furthermore, a DLP service that sits between an end user and a content management system can enforce DLP policies on the content item only and not metadata associated with the content item but stored separately and only while the content item is under the service's control. For example, a DLP service no longer has the ability to affect access of a content item after the DLP service delivers the content item to the user device or the content management system. For example, a DLP service can scan a content item and allow the content item to be downloaded by a user based on one set of rules. If an administrator later updates the rules such that the content item is no longer allowed to be downloaded by that user, the DLP service is unable to stop access to the content item by that user.

The disclosed technology overcomes many of these technical obstacles and enables further data loss prevention (DLP) features within an online content management system. Some embodiments use a sharing service within a content management system to establish and enforce a DLP policy containing a number of rules. The content management system may scan content items stored on the content management system and generate a log of DLP violations that contains a record of each violation of the DLP policy. For example, the record may reference the content items that violated a rule in the DLP policy and a reference to rule that was violated.

An administrator may update the DLP policy to add new rules, remove rules, or change existing rules. If a rule was updated, the content management system may identify, based on the log of DLP violations, one or more content items that were flagged as having violated the old rule and update the permissions for those content items based on the update to the rule. In some embodiments, the content management system may rescan content items as appropriate, based on the update to the rule. Because the content management system has persistent access to the content items, the scan of the content items may be performed in the background or when computing resources are available and not cause additional delay for end users when accessing content. Furthermore, in some embodiments, every content item does not need to be rescanned for each change to a rule in the DLP policy. Instead, methods and systems described with respect to various embodiments provide for more intelligent processing of content items in response to changes in a rule.

As will be discussed in further detail below, in some embodiments, the content management system is able to facilitate collaboration between users. Collaboration features include content item sharing, commenting on content items, co-working on content items, instant messaging, providing presence and seen state information regarding content items, etc. Much of the collaborative data or elements (e.g., comments, annotations, or other collaboration content item elements) related to the content items resides on the content management system and is stored separately from the content item and, as such, may not be scanned by a DLP service that sits between an end user and a content management system. Some embodiments of subject technology allow for the sharing service within the content management system to scan the content items as well as the collaborative data associated with the content item that is stored on the content management system.

In some embodiments, the disclosed technology is deployed in the context of a content management system having content item synchronization capabilities and collaboration features, among others. An example system configuration 100 is shown in FIG. 1, which includes content management system 110 interacting with client device 150.

Accounts

Content management system 110 can store content items in association with accounts, as well as perform a variety of content item management tasks, such as retrieve, modify, browse, and/or share the content item(s). Furthermore, content management system 110 can enable an account to access content item(s) from multiple client devices.

Content management system 110 supports a plurality of accounts. An entity (user, group of users, company, etc.) can create an account with content management system, and account details can be stored in account database 145. Account database 140 can store profile information for registered entities. In some cases, profile information for a registered entity can include a username and/or email address. Account database 140 can include account management information, such as account type (e.g. various tiers of free or paid accounts), storage space allocated, storage space used, client devices 150 having a registered content management client application 152 resident thereon, security settings, personal configuration settings, etc.

Account database 140 can store groups of accounts associated with an entity. Groups can have permissions based on group policies (e.g., data loss prevention policies) and/or access control lists, and members of a group can inherit the permissions. For example, a marketing group can have access to one set of content items while an engineering group can have access to another set of content items. An administrative group can modify groups, modify user accounts, etc.

Content Item Storage

A feature of content management system 110 is the storage of content items, which can be stored in content storage 142. Content items can be any digital data such as documents, collaboration content items, text files, audio files, image files, video files, webpages, executable files, binary files, etc. A content item can also include collections or other mechanisms for grouping content items together with different behaviors, such as folders, zip files, playlists, albums, etc. A collection can refer to a folder, or a plurality of content items that are related or grouped by a common attribute. In some embodiments, content storage 142 can be combined with other types of storage or databases to handle specific functions. Content storage 142 can store content items, while metadata regarding the content items can be stored in metadata database 146. Likewise, data regarding where a content item is stored in content storage 142 can be stored in content directory 144. Additionally, data regarding changes, access, etc. can be stored in server file journal 148. Each of the various storages/databases such as content storage 142, content directory 144, server file journal 148, and metadata database 146 can be comprised of more than one such storage or database and can be distributed over many devices and locations. Other configurations are also possible. For example, data from content storage 142, content directory 144, server file journal 148, and/or metadata database 146 may be combined into one or more content storages or databases or further segmented into additional content storages or databases. Thus, content management system 110 may include more or less storages and/or databases than shown in FIG. 1.

In some embodiments, content storage 142 is associated with at least one content management service 116, which includes software or other processor executable instructions for managing the storage of content items including, but not limited to, receiving content items for storage, preparing content items for storage, selecting a storage location for the content item, retrieving content items from storage, etc. In some embodiments, content management service 116 can divide a content item into smaller blocks of data for storage at content storage 142. The location of each data block making up a content item can be recorded in content directory 144. Content directory 144 can include a content entry for each content item stored in content storage 142. The content entry can be associated with a unique ID, which identifies a content item.

In some embodiments, the unique ID, which identifies a content item in content directory 144, can be derived from a deterministic hash function. This method of deriving a unique ID for a content item can almost always ensure that content item duplicates are recognized as such since the deterministic hash function will generally output the same identifier for every copy of the same content item, but will output a different identifier for a different content item. Using this methodology, content management service 116 can output a unique ID for each content item.

Content management service 116 can also designate or record a content path for a content item. The content path can include the name of the content item and/or folder hierarchy associated with the content item. For example, the content path can include a folder or path of folders in which the content item is stored in a local file system on a client device. Content management service 116 can use the content path to present the content items in the appropriate folder hierarchy, such as a tree-like directory structure. While content items are stored in content storage 142 in blocks and may not be stored under a tree like directory structure, such directory structure is a comfortable navigation structure for users Content management service 116 can define or record a content path for a content item wherein the "root" node of a directory structure can be a namespace for each account. Within the namespace can be a directory structure defined by a user of an account and/or content management service 116. Content directory 144 can store the content path for each content item as part of a content entry.

In some embodiments, the namespace can include additional namespaces that appear in the directory structure as if they are stored within the root node. This can occur when an account has access to a shared collection. Shared collections can be assigned their own namespace within content management system 110. While shared collections are actually a root node for the shared collection, they are located subordinate to the user account namespace in the directory structure, and can appear as a folder within a folder for the user account. As addressed above, the directory structure can be a comfortable navigation structure for users, but does not necessarily correlate to storage locations of content items in content storage 142.

While the directory structure in which an account views content items does not necessarily correlate to storage locations at content management system 110, the directory structure can generally correlate to storage locations on client device 150 depending on the file system used by client device 150.

As addressed above, a content entry in content directory 144 can also include the location of each block of data making up a content item. More specifically, the content entry can include content pointers that identify the location in content storage 142 of the data blocks that make up the content item.

In addition to a content path and content pointer, a content entry in content directory 144 can also include a user account identifier that identifies the user account that has access to the content item and/or a group identifier that identifies a group with access to the content item. In some embodiments, multiple user account identifiers can be associated with a single content entry indicating that the content item has shared access by the multiple user accounts. In some embodiments, user account identifiers associated with a single content entry can specify different permissions for the associated content item. In some embodiments, content directory 144 can describe a hierarchical structure of content items associated with a user account, the hierarchical structure being specific to the user account.

Content management service 116 can decrease the amount of storage space required by identifying duplicate content items or duplicate blocks that make up a content item or versions of a content item. Instead of storing multiple copies, content storage 142 can store a single copy of the content item or block of the content item and content directory 144 can include a pointer or other mechanism to link the duplicates to the single copy.

Content management service 116 can also store metadata describing content items, content item types, folders, file path, and/or the relationship of content items to various accounts, collections, or groups in metadata database 146, in association with the unique ID of the content item.

Content management service 116 can also store a log of data regarding changes, access, etc. in server file journal 148. Server file journal 148 can include the unique ID of the content item and a description of the change or access action along with a time stamp or version number and any other relevant data. Server file journal 148 can also include pointers to blocks affected by the change or content item access. Content management service can provide the ability to undo operations, by using a content item version control system that tracks changes to content items, different versions of content items (including diverging version trees), and a change history that can be acquired from the server file journal 148. The change history can include a set of changes that, when applied to the original content item version, produces the changed content item version.

Content Item Synchronization

Another feature of content management system 110 is synchronization of content items with at least one client device 150. Client device(s) can take different forms and have different capabilities. For example, client device 170 is a computing device having a local file system accessible by multiple applications executing on the device. Client device 172 is a computing device in which content items may only be accessible to a specific application or by permission given by the specific application, and the content items can be stored in an application specific space and/or in a remote network. Client device 174 is any client device accessing content management system 110 via a web browser and accessing content items via a web interface. While example client devices 170, 172, and 174 are depicted in form factors such as a laptop, mobile device, or web browser, it should be understood that these descriptions do not limit clients devices to these form factors. For example, a mobile device, such as client device 172, may have a local file system accessible by multiple applications executing on the device, or client device 172 may access content management system 110 via a web browser. As such, the form factor should not be considered limiting when considering client device 150's capabilities. One or more functions described in this disclosure with respect to client device 150 may or may not be available on every client device depending on the specific capabilities of the device—the file access model being one such capability.

In many embodiments, client devices are associated with an account of content management system 110, but in some embodiments, client devices can access content using shared links and do not require an account.

As noted above, some client devices can access content management system 110 using a web browser. However, client devices can also access content management system 110 using client application 152 stored and running on client device 150. Client application 152 can include a content item synchronization service 156.

Content item synchronization service 156 can be in communication with content management service 116 to synchronize changes to content items between client device 150 and content management system 110.

Client device 150 can synchronize content with content management system 110 via content synchronization service 156. The synchronization can be platform agnostic. That is, content can be synchronized across multiple client devices of varying type, capabilities, operating systems, etc. Content synchronization service 156 can synchronize any changes (new, deleted, modified, copied, or moved content items) to content items in a designated location of a file system of client device 150.

Content items can be synchronized from client device 150 to content management system 110, and vice versa. In embodiments in which client device 150 initiates synchronization of content items with content management system 110, a user can manipulate content items directly from the file system of client device 150, while file system extension 156 (which can be integrated with the local file system, or even the operating system kernel) can intercept read, write, copy, move, delete commands relative to content items in the designated location of the file system of client device 150. When file system extension 156 detects a write, move, copy, or delete command, it can notify content item synchronization service 156, which can synchronize the changes to content management system service 116. In some embodiments, content item synchronization service 156 can perform some functions of content management system service 116 including functions addressed above such as dividing a content item into blocks, hashing the content item to generate a unique identifier, etc. Content synchronization service 156 can index content within client storage index 164 and save the result in storage index 164. Indexing can include creating a unique identifier for each content item. In some embodiments, content synchronization service 156 creates this unique identifier by putting the data of the content item (e.g., excluding the filename and/or other metadata) through a hash function; as addressed above, content management system can use a similar process to provide identifiers to content on content management system 110. Content synchronization service 156 can use storage index 164 to facilitate the synchronization of at least a portion of the content within client storage with content associated with a user account on content management system 110. For example, content synchronization service 156 can compare storage index 164 with content management system 110 and detect differences between content on client storage and content associated with a user account on content management system 110. Content synchronization service 156 can then attempt to reconcile differences by uploading, downloading, modifying, and/or deleting content on client storage as appropriate. Content management service 116 can store the changed or new block for the content item and update server file journal 148, metadata database 146, content directory 144, content storage 142, account database 140, etc., as appropriate.

When synchronizing content from content management system 110 to client device 150, a modification, addition, deletion, and/or move of a content item recorded in server file journal 148 can trigger delivery of a notification to client device 150 using notification service 117. When client device 150 receives the notification of the change to server file journal 148, client device 150 can check storage index 164 to determine if the time stamp of the change occurred since the last synchronization, or determine if the specific change has been synchronized. When client device 150 determines that it is out of synchronization with content management system 110, content item synchronization service 156 can request content item blocks including the changes, and client device 150 can update its local copy of the changed content items. In some embodiments, notification service 117 can query other services or databases of content management system 110, such as server file journal 148, to gain more context for the notification, to determine if a notification can be batched with another notification, or to supplement a notification, etc.

Sometimes client device 150 might not have a network connection available. In this scenario, content item synchronization service 156 can monitor the linked collection for content item changes and queue those changes for later synchronization to content management system 110 when a network connection is available. Similarly, a user can manually start, stop, pause, or resume synchronization with content management system 110.

Content item synchronization service 156 can synchronize all content associated with a particular user account on content management system 110. Alternatively, content item synchronization service 156 can selectively synchronize a portion of the content of the total content associated with the particular user account on content management system 110. Selectively synchronizing only a portion of the content can preserve space on client device 150 and improve performance of client device 150 and content management system 110 by reducing the processing, memory, storage, and network resources that would otherwise be consumed by synchronizing all content.

In some embodiments, content item synchronization service 156 selectively stores a portion of the content associated with the particular user account and stores placeholder content items in client storage for the remainder portion of the content. For example, content item synchronization service 156 can store a placeholder content item that has the same filename, path, extension, metadata, of its respective complete content item on content management system 110, but lacking the data of the complete content item. The placeholder content item can be a few kilobytes or less in size while the respective complete content item might be significantly larger. After client device 150 attempts to access the content item, content item synchronization service 156 can retrieve the data of the content item from content management system 110 and provide the complete content item to accessing client device 150. This approach can provide significant space and bandwidth savings while still providing full access to a user's content on content management system 110.

Collaboration Features

Another feature of content management system 110 is to facilitate collaboration between users. Collaboration features include content item sharing, commenting on content items, co-working on content items, instant messaging, providing presence and seen state information regarding content items, etc.

Sharing

Content management system 110 can manage sharing of content via sharing service 128. Accounts of content management system 110 can share content with one another by providing a link to the content. Sharing service 128 can then provide access to the shared content item from any computing device in network communication with content management system 110. However, in some embodiments, a link can be associated with access restrictions enforced by content management system 110. Sharing service 128 can also facilitate indirect sharing of content within content management system 110 by enabling an account to share shared content with at least one additional user account (in addition to the original user account associated with the content item) so that each user account has access to the content item. The additional user account can gain access to the content by accepting the content, which will then be accessible via web interface service 124 or the directory structure associated with the additional user's account on client device 150. The sharing can be performed in a platform agnostic manner. That is, the content can be shared across multiple client devices 150 of varying types, capabilities, operating systems, etc. The content can also be shared across varying types of user accounts.

To share a content item within content management system 110 sharing service 128 can add a user account identifier to a content entry in access control list database 145 associated with the content item, thus granting the added user account access to the content item. Sharing service 128 can also remove user account identifiers from a content entry to restrict a user account's access to the content item. Sharing service 128 can record content item identifiers, user account identifiers given access to a content item, and access levels in access control list database 145.

To share content items outside of content management system 110, sharing service 128 may generate a custom network address, such as a uniform resource locator (URL), which can allow any web browser to access the content item or collection in content management system 110 without authentication. To accomplish this, sharing service 128 can include content identification data in the generated URL, which can later be used to properly identify and return the requested content item. For example, sharing service 128 can include the account identifier and the content path or a content item identifying code in the generated URL. Upon selection of the URL, the content identification data included in the URL can be transmitted to content management system 110. Content management system 110 can then use the received content identification data to identify the appropriate content item and return the content item.

In addition to generating the URL, sharing service 128 can also record the URL in access control list database 145. In some embodiments, the content entry associated with a content item can include a URL flag indicating whether a URL to the content item has been created. For example, the URL flag can be a Boolean value initially set to 0 or false to indicate that a URL to the content item has not been created. Sharing service 128 can change the value of the flag to 1 or true after generating a URL to the content item.

In some embodiments, sharing service 128 can associate a set of permissions to a URL for a content item. For example, if a user attempts to access the content item via the URL, sharing service 128 can provide a limited set of permissions for the content item. Examples of limited permissions include restrictions that the user cannot download the content item, save the content item, copy the content item, modify the content item, etc. In some embodiments, limited permissions include restrictions that only permit a content item to be accessed from with a specified domain, e.g., from within a corporate network domain, or by accounts associated with a specified domain, e.g., accounts associated with a company account (e.g., @acme.com).

In some embodiments, sharing service 128 can also deactivate a generated URL or otherwise unshare a content item. For example, each content entry can also include an active sharing flag indicating whether the content is still shared, and sharing service 128 may only return a requested content item if the active sharing flag is set to 1 or true. Thus, access to a previously shared content item can be restricted by changing the value of the active sharing flag. This can allow a user to restrict access to the shared content item without having to move the content item, delete the generated URL, etc. Likewise, sharing service 128 can reactivate sharing by again changing the value of the active sharing flag to 1 or true. A user can thus easily restore access to the content item without the need to generate a new sharing mechanism, e.g., a new URL.

In some embodiments, content management system 110 can designate a location, such as a URL, for uploading a content item. For example, a first user account can request for an upload location from sharing service 128 a, provide the upload location to a second user account (or other user in some cases). The second user account or other user can upload a content item to the first user account using the upload location.

Monitoring Interactions with Shared Content Items

In some embodiments, content management system 110 can provide information about user interactions with a shared content item. In some embodiments, content management system 110 can report that a user is currently viewing the shared content item. For example, client collaboration service 160 can request notifications service 117 to send notifications to other client devices having access to the shared content item when any one client device accesses the shared content item. Notifications service 117 can then notify all client devices regarding access to the shared content item by the one client device. In some embodiments, the interaction data can also serve as a proxy for the presence of a user owning and/or operating the one client device.

In some embodiments, content management system 110 can report a history of user interactions with a shared content item. Collaboration service 126 can query data sources such as metadata database 146 and server file journal 148 to determine that a user account has saved the content item, that a user account has yet to access the content item, etc., and disseminate this information using notification service 117 to other user accounts to determine which user accounts have (or have not) interacted with the shared content item.

In some embodiments, collaboration service 126 can facilitate commenting for content, even if a content item does not natively support commenting functionality. Such comments can be stored in metadata database 146.

In some embodiments, collaboration service 126 can originate and transmit notifications for users. For example, a first user can mention a second user in a comment and collaboration service 126 can send a notification to the second user that he has been mentioned in the comment. Various other content item events can trigger notifications, including deleting a content item, sharing a content item, etc.

In general, collaboration service 126 can provide a messaging platform whereby users can send and receive instant messages, voice calls, emails, etc.

Collaboration on Content Items

Collaboration service 126 can also provide an interactive content item collaboration platform in which users can simultaneously make changes to shared content items, provide comments regarding the shared content items, manage tasks associated with the shared content items, etc. These shared content items can be files that user accounts can create and edit using a content item editor, and can contain elements for enabling collaboration. These collaboration elements may include a collaboration identifier, one or more author and/or editor identifiers, collaboration text, collaboration attributes, interaction information, comments, sharing users, etc. The collaboration elements may be stored in database entries to allow for search and retrieval of the shared content items. Multiple user accounts may access, view, edit, and otherwise collaborate on shared content items at the same time or at different times. In some embodiments, this can be managed through a web interface that enables two users to work on the same copy of a shared content item at the same time.

Collaboration Client Interface

In some embodiments, client collaboration service 160 can provide a native application interface for the purpose of displaying information relevant to a content item being presented on client device 150. In some embodiments, certain content items associated with a native application may not be capable of presenting the collaboration data addressed above. In such embodiments, client collaboration service 160 can detect that a user has opened a content item, and can provide an overlay with additional information for the content item, such as the collaboration data. For example, the additional information can include comments for the content item, a status of the content item, interactions with the content item by other users, etc. Such an overlay can warn a user that changes might be lost because another user is currently editing the content item.

In some embodiments, one or more of the services or storages/databases discussed above can be accessed using public or private application programming interfaces.

Certain software applications can access content storage 142 via an API on behalf of a user account. For example, a software package, such as an application running on client device 150, can programmatically make API calls directly to content management system 110 when a user account provides authentication credentials, to read, write, create, delete, share, or otherwise manipulate content.

A user can utilize a user account to view or manipulate content via a web interface generated and served by web interface service 124. For example, the user can navigate in a web browser to a web address associated with the user account provided by content management system 110. Changes or updates to content in content storage 160 made through web interface 124, such as uploading a new version of a content item, can be propagated back to other client devices associated with the user account. For example, multiple client devices, each with their own client software, can be associated with a single account and content items in the account can be synchronized between each of the multiple client devices.

Client device 150 can connect to content management system 110 on behalf of a user account. A user of the user account can directly interact with client device 150, for example when client device 150 is a desktop or laptop computer, phone, television, internet-of-things device, etc. Alternatively or additionally, client device 150 can act on behalf of the user account without the user having physical access to client device 150, for example when client device 150 is a server.

Some features of client device 150 are enabled by an application installed on client device 150. In some embodiments, the application can include a content management system specific component. For example, the content management system specific component can be a stand-alone application 152, one or more application plug-ins, and/or a browser extension. However, the user can also interact with content management system 110 via a third-party application, such as a web browser, word processor, spreadsheet program, presentation program, source code control tool, etc. that resides on client device 150 and capable of communicating with content management system 110. In various implementations, client-side application 152 can present a user interface (UI) for a user to interact with content management system 110. For example, the user can interact with the content management system 110 via file system extension 153 integrated with the file system or via a webpage displayed using a web browser application.

In some embodiments, client application 152 can manage and synchronize content for more than one account of content management system 110. In such embodiments, client application 152 can remain logged into multiple accounts and provide normal services for the multiple accounts. In some embodiments, each account can appear as folder in a file system, and all content items within that folder can be synchronized with content management system 110. In some embodiments, client application 152 can include a selector to choose one of the multiple accounts to be the primary account or default account.

While this disclosure presents content management system 110 with specific components, it will be understood by one skilled in the art, that the architectural configuration of system 100 is simply one possible configuration and that other configurations with more or fewer components are possible. Further, a service can have more or less functionality, even including functionality described as being associated with another service. Moreover, features described in this disclosure with respect to a particular embodiment can be combined with features described with respect to another embodiment.

While system 100 is presented with specific components, it will be understood by one skilled in the art, that the architectural configuration of system 100 is simply one possible configuration and that other configurations with more or fewer components are possible.

In some embodiments, sharing service 128 of content management system 110 may also enable data loss prevention (DLP) features. For example, the sharing service 128 may store a DLP policy in account database 140. The DLP policy may contain a number of rules governing the use, sharing, or dissemination of content for a group or an individual. The rules may include a condition that can be used to identify content items during a scan, and a restriction to govern how the identified content item will be handled based on the DLP policy.

In some embodiments, the condition may include one or more keywords, regular expressions, or patterns. The conditions may be configured to identify data that is typically considered sensitive or data that is sensitive. For example, the conditions may include keywords such as "confidential," "salary," "secret," "trade secret," "do not redistribute," "privileged," or other words or combinations of words that typically accompany sensitive information. Patterns such as XXXX-XXXX-XXXX-XXXX for credit card numbers or XXX-XX-XXXX for social security numbers may also be included as conditions in the DLP policy. Other patterns for drivers license numbers, bank account numbers, phone numbers, email addresses, addresses, or other personally identifiable information (PII) may also be used as conditions. Certain conditions may be configured based on a particular use case or industry. For example, industry specific conditions may include the keywords "buy," "sell," or "short" in financial services industries or patterns for serial numbers of medical records in the medical industry.

The restriction is associated with one or more conditions and may dictate how content items found to violate the DLP based on the associated conditions will be handled by content management system 110. Restrictions may include warnings, limitations on sharing, or other restrictions such as blocking an upload of an offending content item so that it is not stored on content management system 110 or quarantining the content item. Restrictions may specify, for example, users will be notified or warned that the content item may contain sensitive information when the content item is found or when the user attempts to share or download the content item. Other restrictions may prohibit sharing of content items that violate certain conditions, prohibit the download of those content items, or limit sharing/downloading to only members of a group.

In some embodiments, the content management system may enable certain DLP features to be active by default or enable an administrator (admin) to turn on the DLP features, customize the DLP policy, create DLP rules, or change any of the DLP settings. For example, an administrator on a client device may activate DLP features in content management system 110 for a group of users for which the administrator is responsible.

Figure 2:
FIG. 2 shows an example graphical user interface for enabling data loss prevention (DLP) features in a content management system according to some embodiments.

FIG. 2 shows an example graphical user interface 200 for enabling data loss prevention (DLP) features in content management system 110 according to some embodiments. Graphical user interface 200 may be presented on a client-side application installed on a client device. In some embodiments, the client-side application can include a content management system specific component. For example, the content management system specific component can be a stand-alone application, one or more application plug-ins, and/or a browser extension. However, the user can also interact with content management system 110 via a third-party application, such as a web browser, that resides on the client device and is configured to communicate with content management system 110.

Graphical user interface 200, as illustrated in FIG. 2, may be displayed to an administrator for a group of users of content management system 110. For example, the administrator may be responsible for a company, a department, or other organization. Graphical user interface 200 includes an option 202 for the administrator to enable DLP features provided by content management system 110. Once the administrator selects the DLP option 202, content management system 110 may allow the administrator to configure the DLP policy for the group.

Figure 3:
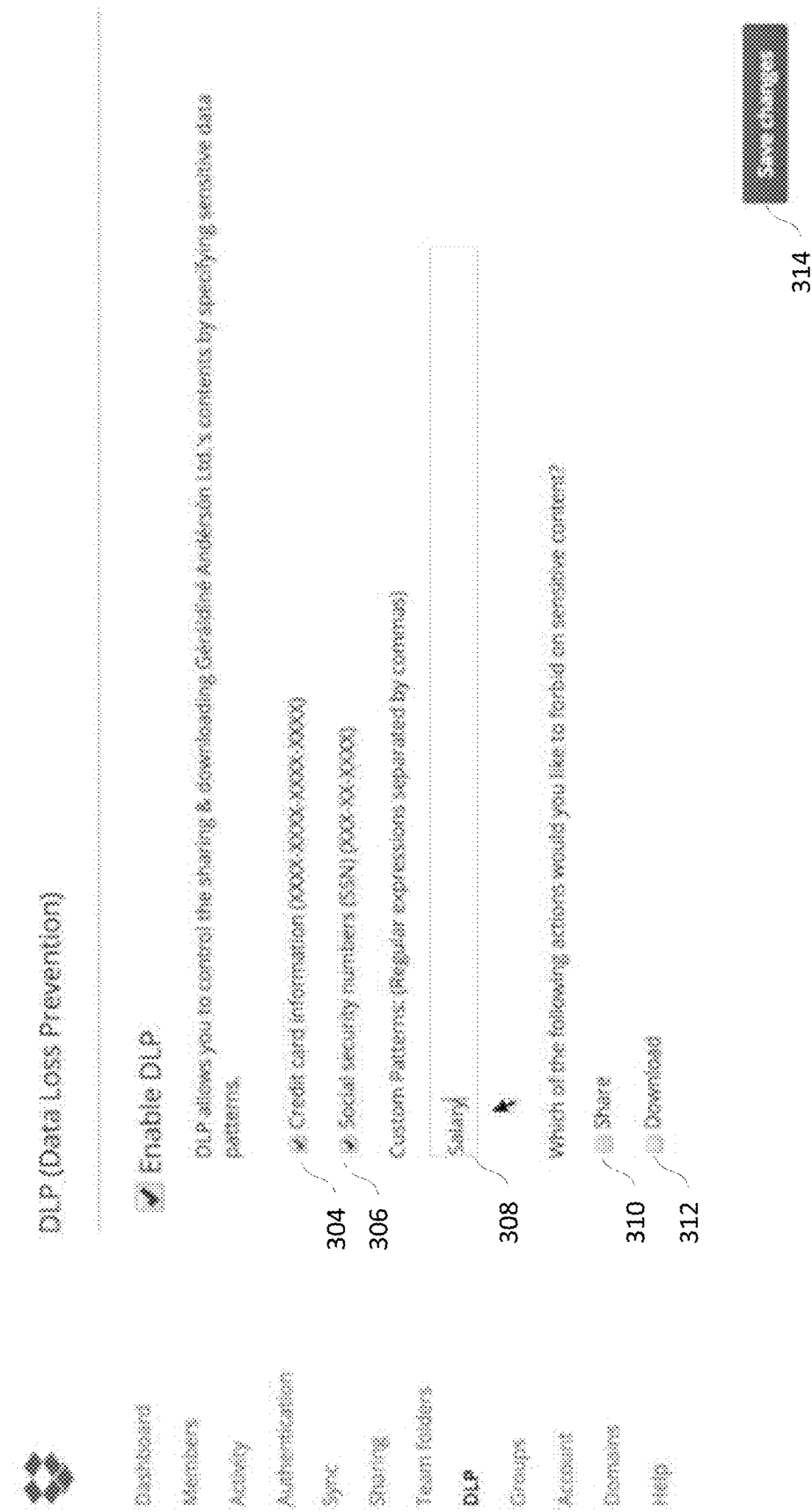
FIG. 3 shows an example graphical user interface for configuring data loss prevention (DLP) features in a content management system according to some embodiments.

FIG. 3 shows an example graphical user interface 300 for configuring data loss prevention (DLP) features in content management system 110 according to some embodiments. As illustrated in FIG. 3, graphical user interface 300 may include options for conditions that the administrator may select. For example, the administrator may select a predefined condition 304 for credit card numbers that include the pattern XXXX-XXXX-XXXX-XXXX or a predefined condition 306 for social security numbers that include the pattern XXX-XX-XXXX.

Graphical user interface 300 may also include a field 308 that allows an administrator to define custom conditions. An administrator may input keywords (such as "Salary"), regular expressions, or patterns that may be used to define a custom condition. Graphical user interface 300 may also include a number of restrictions 310 and 312 to be applied to content items that are identified based on the specified conditions. In FIG. 3, the restrictions include a restriction on sharing 310 content items identified based on the specified conditions and a restriction on downloading 312 content items identified based on the specified conditions.

Although FIG. 3 illustrates embodiments where the administrator may select restrictions 310 and 312 that are applied to every selected condition, in some embodiments, the administrator may be able to apply restrictions to specific conditions and other restrictions to other conditions. For example, when defining the DLP policy, the administrator may choose to forbid sharing of content items that contain credit card information and social security numbers but only restrict downloading of content items that contain the term "salary."

FIG. 2 and FIG. 3 illustrate example graphical user interfaces for enabling and configuring DLP features in content management system 110. In other embodiments, the graphical user interfaces may include additional elements, fewer elements, or alternative elements. For example, additional options may include predefined sets of conditions for certain use cases or industries or options for structured data. Structured data may include forms or other documents that have a typical structure (e.g., a check or purchase order). The structured data option may have predefined types of documents or allow the administrator to upload a form that may be used as a template for searching for other documents that follow a similar structure. Certain embodiments may also allow the administrator to exclude certain documents from scanning such as photos, audio files, videos, or documents with certain keywords, or patterns. In other embodiments, the graphical user interfaces may further include additional types of restrictions such as warnings to users when content that meets the condition is uploaded, warnings to users when the user attempts to share or download the content, blocking the upload or storing of such content, or the quarantine of such content.

Once the administrator is finished creating or updating a DLP policy, the administrator may save the changes 314 and the client-side application installed on the client device may transmit the DLP policy to content management system 110 where sharing services 128 may store the policy in account database 140. The policy may be stored as one or more rules, where each rule includes one or more conditions used to identify content items with sensitive data and one or more restrictions to apply to content items that trigger the one or more conditions for the rule.

If there was no previous DLP policy for the group, content management system 110 may scan content items stored or managed by the content management system 110 for the group. The content management system 110 may identify content items that meet the one or more conditions in the DLP policy and apply the appropriate restrictions based on the policy.

In some embodiments, a log of DLP policy violations may be generated and stored by at the content management system 110. The log of DLP policy violations may include a record of each violation of the DLP policy and specify the rule that was violated and the content item that violated the rule. Content items may also be scanned as content items are uploaded to content management system 110 or as changes are made to content items stored by content management system 110. If content items are found to be in violation of one or more rules of the DLP policy, a record of the violation may be added to the log of DLP policy violations. Additionally, if content items are no longer in violation based on a change to the content item, the record for the violation may be removed from the log.

If the administor removes a rule in the DLP policy, content management system 110 may remove entries in the log of DLP violations pertaining to the removed rule and update content item restrictions for the content items referenced in the removed entries, if necessary. If the administor updates a rule in the DLP policy, content management system 110 may identify, based on the log of DLP violations, content items that have violated the previous version of the updated rule and rescan these content items stored on content management system 110. The log of DLP violations and the restrictions on these content items may then be updated based on the result of the scan.

Because the content items are stored on content management system 110, content management system 110 is able to access the content items to perform the scanning or rescanning of the content items at any time, not only during the uploading process or downloading process. Furthermore, the scans may be performed in the background or when computing resources are available and not cause additional delay for end users waiting to access content content. Furthermore, the log of DLP violations provides information on what rules content items have violated. As such, when a rule is updated or removed, not all content items need to be rescanned. Instead, only those content items that should be rescanned based on the changed rule can be rescanned and content items that violated rules that have been removed can have their permissions updated without the need for rescanning.

In some embodiments, content items may be shared with others by using a link generated by content management system 110. A scenario may occur where a user shares a content item with others using a link to the content item. After the user shares the link, an administrator may change the DLP policy such that the content item may violate a rule in the DLP policy. Content management system 110 may rescan the content item based on the change in DLP policy and restrict access to the content item based on the violation to the rule. Subsequent requests for access to the content item using the link will be goveners by the new restrictions on the content item. Furthermore, an administrator may again change the DLP policy such that the content item is no longer in violation. Content management system 110 may update the restrictions to the content item such that access to the content item using the link is restored. In such a way, access to the content item may stay up to date in a way not possible if the user sent a copy of the content item or if a DLP service was unable to persistently access the content items to scan and modify restrictions to the content items stored on content management system 110.

The scanning and rescanning of content items may require some time and additional computing resources. According to some embodiments, content management system 110 may use a flag to indicate that DLP restrictions for a content item is not up to date. For example, when a new DLP policy is created by an administrator or the administrator updates a DLP policy, each content item to be scanned may be flagged to indicate that the content item is not up to date. Content management system 110 will attempt to scan all content items that need to be scanned. However, in some cases, a content item may not be scanned before a user attempts to use the content item. Accordingly, if a user requests access a content item or requests to share a content item, content management system 110 may determine if the requested content item is up to date based on the flag. If the content item is up to date, the user may access the content item as usual (e.g., based on the appropriate permissions and restrictions). If the content item is not up to date based on the flag, content management system 110 may scan the requested content item and update the DLP restrictions for the content item based on the scan before providing usual access to the content item.

The scanning and rescanning of content items includes accessing the digital data for the content item and searching the digital data for something that matches a condition in a rule of the DLP policy. The digital data is often in the form of a file, which may include metadata as a part of the file structure. However, in some cases, metadata associated with a content item is stored separately from the digital data (e.g., the file) of the content item. As described above, content items may be stored in content storage 142 while some metadata may be stored in metadata database 146 of content management system 110.

For example, the collaboration platform provided by collaboration service 126 enables users can simultaneously make changes to shared content items, provide comments regarding the shared content items, manage tasks associated with the shared content items, etc. These shared content items can be files that user accounts can create and edit using a content item editor, and may be associated with elements for enabling collaboration. These collaboration elements may include a collaboration identifier, one or more author and/or editor identifiers, collaboration text, collaboration attributes, interaction information, comments, sharing users, etc. The collaboration elements and other collaboration data can be stored in metadata database 146, separate from content storage 142. According to some embodiments, persistent access to the metadata database 146 by content management system 110 enables content management system 110 to also search metadata stored in metadatabase 146 that is associated with the content item being scanned to identify something that matches a condition in a rule of the DLP policy.

According to some embodiments collaborative content items may be created on content management system 110 and reside permanently on content management system 110. Accordingly, there is no need for a user to create a content item and upload the content item to content management system 110. Instead, the user can create the collaborative content item on content management system 110 directly. The user can share the collaborative content item with others by, for example, providing a link to the content item. Other users may use the link to view, edit, or comment on the collaborative content item on content management system 110 if the users have permission to access the content item. Furthermore, other users may use the link to download a copy of the collaborative content item, if permitted.

Figure 4:
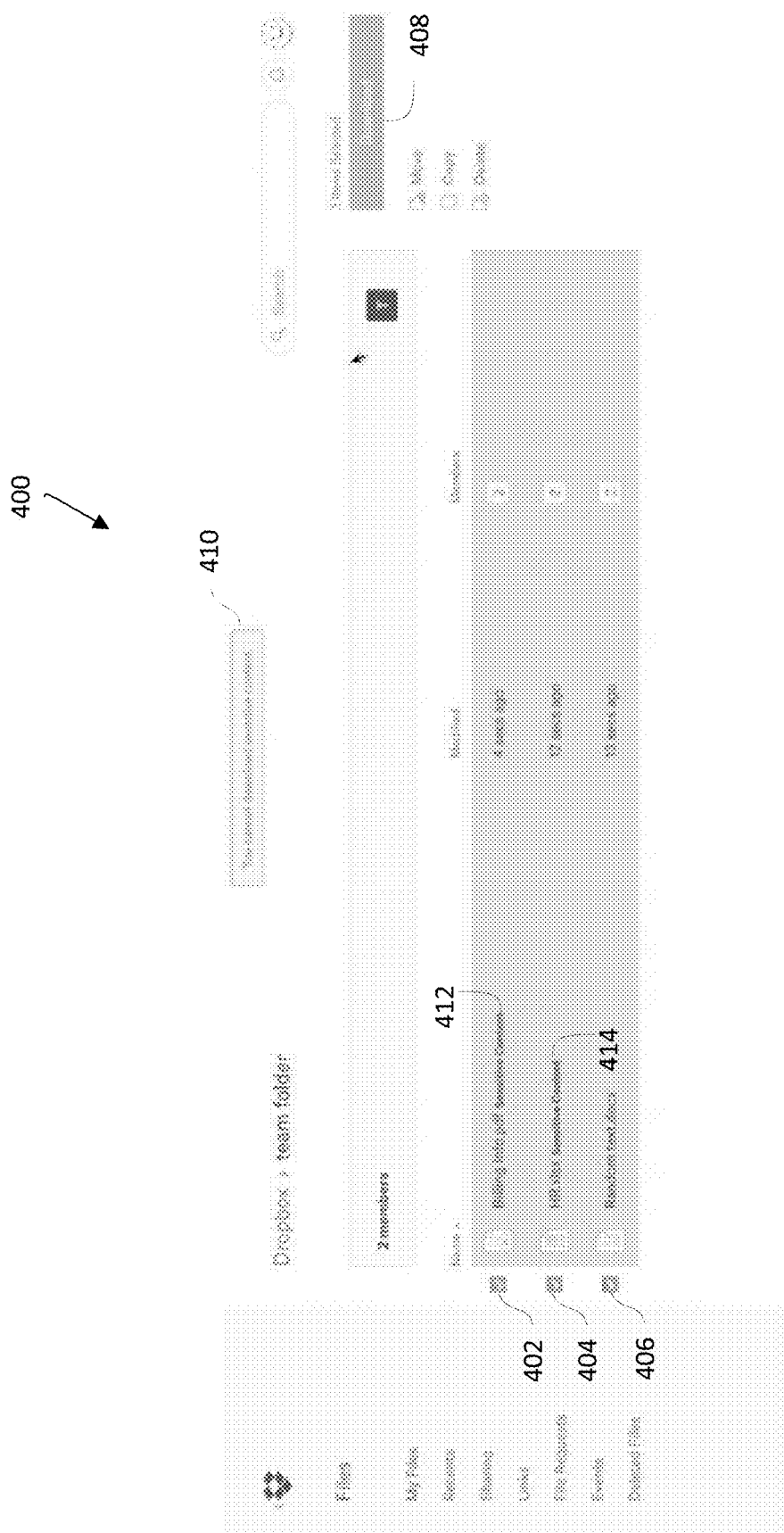
FIG. 4 shows an example graphical user interface for accessing content items stored on a content management system according to some embodiments.

FIG. 4 shows an example graphical user interface 400 for accessing content items stored on content management system 110 according to some embodiments. Graphical user interface 400 shows 3 content items 402, 404, and 406 that have been selected by a user. Content items 402, 404, and 406 may have been uploaded by another user or by the user viewing graphical user interface 400. Two of the content items 402 and 404 are shown to contain sensitive content and have warning 412 and 414 that inform the user that they contain sensitive content. The sensitive content may have been originally in content items 402 and 404 when they were uploaded to content management system 110 or later added to content items 402 and 404 through online collaboration or editing of the content items.

Graphical user interface 400 of FIG. 4 shows the result of a user attempting to download content items containing sensitive content which, according to an example DLP policy, cannot be downloaded. For example, a user may attempt to download 408 the 3 selected content items 402, 404, and 406. Because at least one of the selected content items contains sensitive content, the download of the content items is not allowed and a notification 410 is displayed informing the user that the download of the content items is not allowed. In some embodiments, content management system may allow for the download of content item 406, which does not contain sensitive content.

Figure 5:
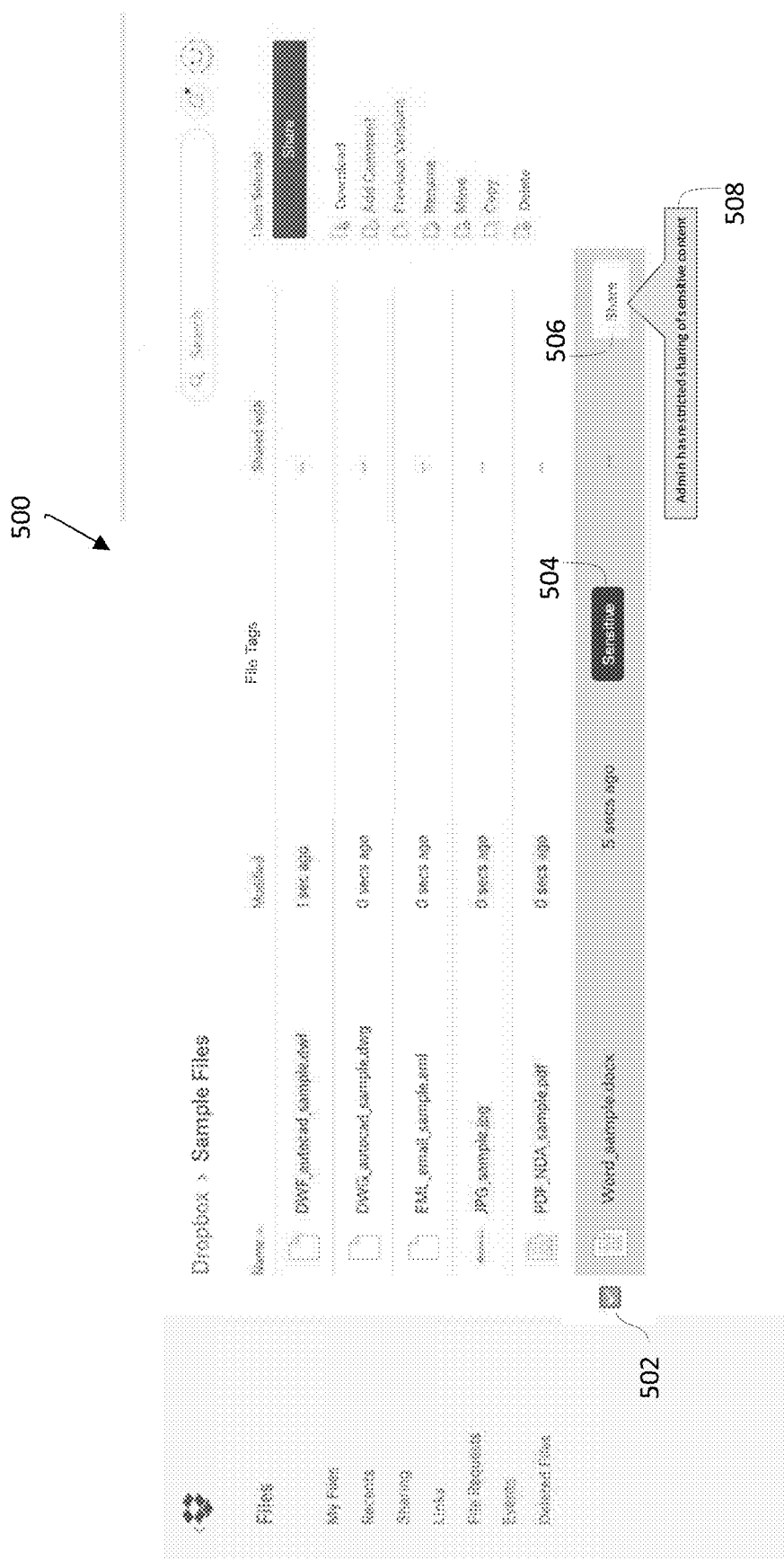
FIG. 5 shows an example graphical user interface for accessing content items stored on a content management system according to some embodiments.

FIG. 5 shows an example graphical user interface 500 for accessing content items stored on content management system 110 according to some embodiments. Graphical user interface 500 shows a list of content items where one content item 502 is selected by the user. Based on a scan of content items, content item 502 contains sensitive information. Accordingly, graphical user interface 500 includes a warning 504 that informs the user that content item 502 includes sensitive information. Furthermore, because sharing of content items with sensitive information is prohibited under an example DLP policy, graphical user interface 500 has disabled the sharing function 506 for content item 502. If the user moves a cursor to the sharing function 506, a pop up 508 may be displayed that informs the user that the administrator has restricted the sharing of sensitive content.

According to some embodiments, content management system 110 may track DLP activity, generate a DLP report, and provide the DLP report to group administrators. The report may include information about users that added content with sensitive information, how many content items with sensitive information a user added, or when a user added content with sensitive information. In some embodiments, content management system 110 may also allow group administrators to suspend users that repeatedly violate DLP policy rules, suspend certain activities for users or for certain content items, or approve sharing or downloading of certain content items containing sensitive information.

Figure 6:
FIG. 6 shows an example graphical user interface for displaying a data loss prevention (DLP) report according to some embodiments.

FIG. 6 shows an example graphical user interface 600 for displaying a data loss prevention (DLP) report according to some embodiments. Graphical user interface 600 may represent a DLP dashboard that is generated by content management system 110 and transmitted to a client device associated with an administrator. The DLP dashboard may allow an administrator to view DLP activity and filter or sort DLP information based on the type of activity 602, the user, the date, or the location. For example, the DLP dashboard displays information regarding 2 incidents where user "Alex Bruce" added sensitive content. The DLP dashboard may also allow an administrator create various reports on DLP activity 604.

Figure 7:
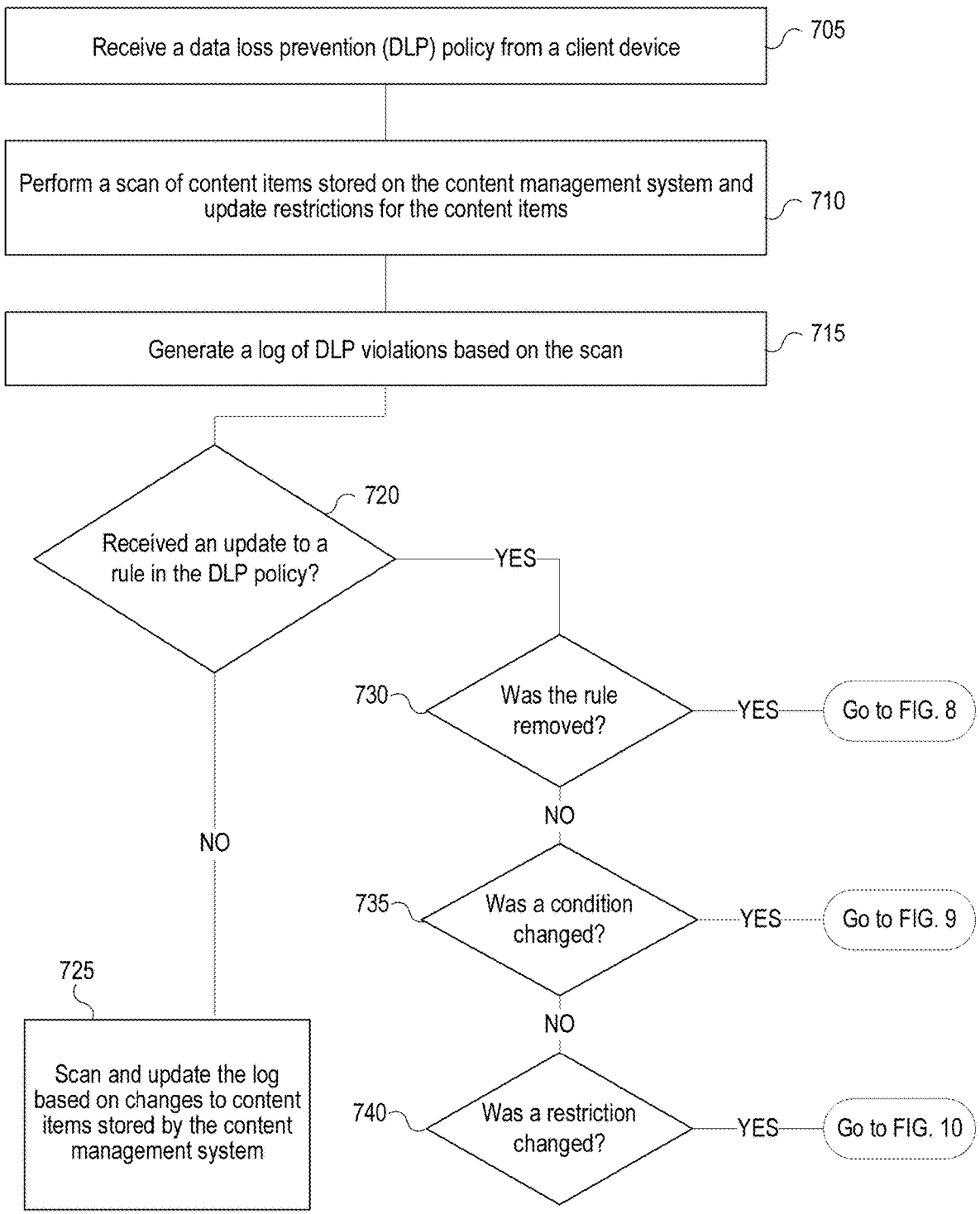
FIG. 7 shows an example method for providing data loss prevention (DLP) features in a content management system according to some embodiments.

FIG. 7 shows an example method 700 for providing data loss prevention (DLP) features in content management system 110 according to some embodiments. Although the methods and processes described herein may be shown with certain steps and operations in a particular order, additional, fewer, or alternative steps and operations performed in similar or alternative orders, or in parallel, are within the scope of various embodiments unless otherwise stated.

Method 700 may be implemented by content management system 110. At operation 705, content management system 110 may receive a DLP policy from a client device. The DLP policy may be received as a result of an administrator enabling DLP features for a group of users of content management system 110 associated with a collection of content items stored by content management system 110. As illustrated in FIG. 2 and FIG. 3, the administrator may enable DLP features and define a DLP policy on the client device and transmit the policy to content management system 110 to be stored in account database 140. In some embodiments, the DLP policy may include one or more rules, where each rule includes one or more conditions used to identify content items with sensitive data and one or more restrictions to apply to content items that trigger the one or more conditions for the rule.

At operation 710, content management system 110 performs a scan of content items associated with the group of users that the DLP policy is configured to govern and update the restrictions for the scanned content items if appropriate. For each rule in the DLP policy, the scan identifies content items that satisfy the rule's one or more conditions and applies the rule's restrictions. A content item found to satisfy the conditions for a rule may be considered in violation of that rule, according to the DLP policy. At operation 715, content management system 110 generates a log of DLP violations based on the scan. The log of DLP policy violations may include a record of each violation of the DLP policy. For example, each record of a violation may specify the rule that was violated and one or more content items that violated the rule.

Content management system 110 may determine whether an update to a rule in the DLP policy is received at operation 720. If there is no update to a rule in the DLP policy, at operation 725, content management system 110 continues to scan content items, update restrictions for content items, and update the log of DLP violations based on changes to the content items. For example, if a user uploads a new content item to content management system 110, content management system 110 may scan the content item based on the DLP policy, update any restrictions for the uploaded content item based on the scan, and update the log of DLP violations if appropriate. Similarly, if one or more users edits an existing content item stored on content management system 110, content management system 110 may scan the edited content item based on the DLP policy, update any restrictions for the edited content item based on the scan, and update the log of DLP violations if appropriate.

If an update to a rule in the DLP policy is received by content management system 110, content management system 110 determines how a rule was updated. Content management system 110 may perform different operations depending on how the rule was updated in order to more efficiently rescan content items, update restrictions for content items, or update the log of DLP violations. For example, at operation 730, content management system 110 determines whether the update to the rule was a removal of the rule. If so, the method continues in FIG. 8.

Figure 8:
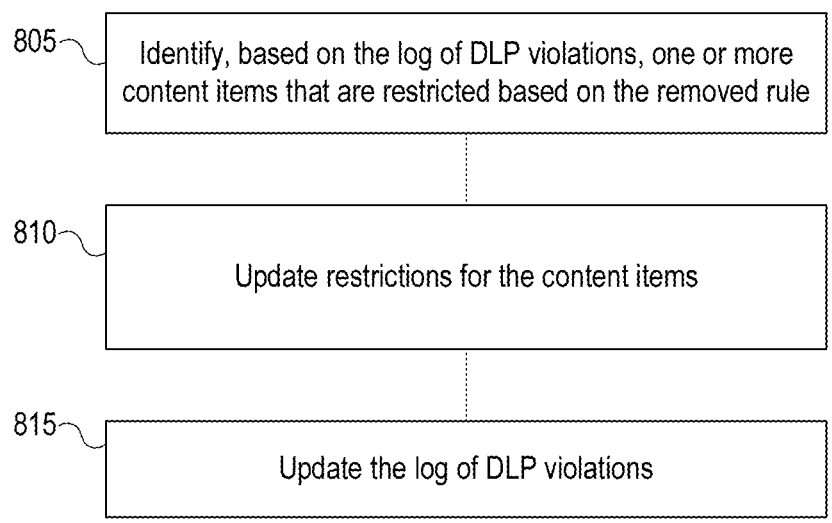
FIG. 8 shows an example method for responding to a removal of a rule from a DLP policy according to some embodiments.

FIG. 8 shows an example method 800 for responding to the removal of a rule from a DLP policy according to some embodiments. At operation 805, content management system 110 identifies, based on the log of DLP violations, one or more content items that are restricted based on the removed rule. For example, some content items may have been restricted based on violations of a particular rule in the DLP policy. Since the administrator removed the rule from the policy, these restrictions based on the violation of the removed rule should also be removed. At operation 810, content management system updates the restrictions for the identified content items accordingly and, at operation 815, the log of DLP violations is updated by removing records associated with violations of the removed rule.

Returning to FIG. 7, at operation 735, content management system 110 determines whether the update to the rule was a change to a condition in the rule. For example, an administrator may change a condition in an existing rule or add a new rule with at least one new condition and one or more restrictions to the DLP policy. If content management system 110 detects a change to a condition, the method continues in FIG. 9.

Figure 9:
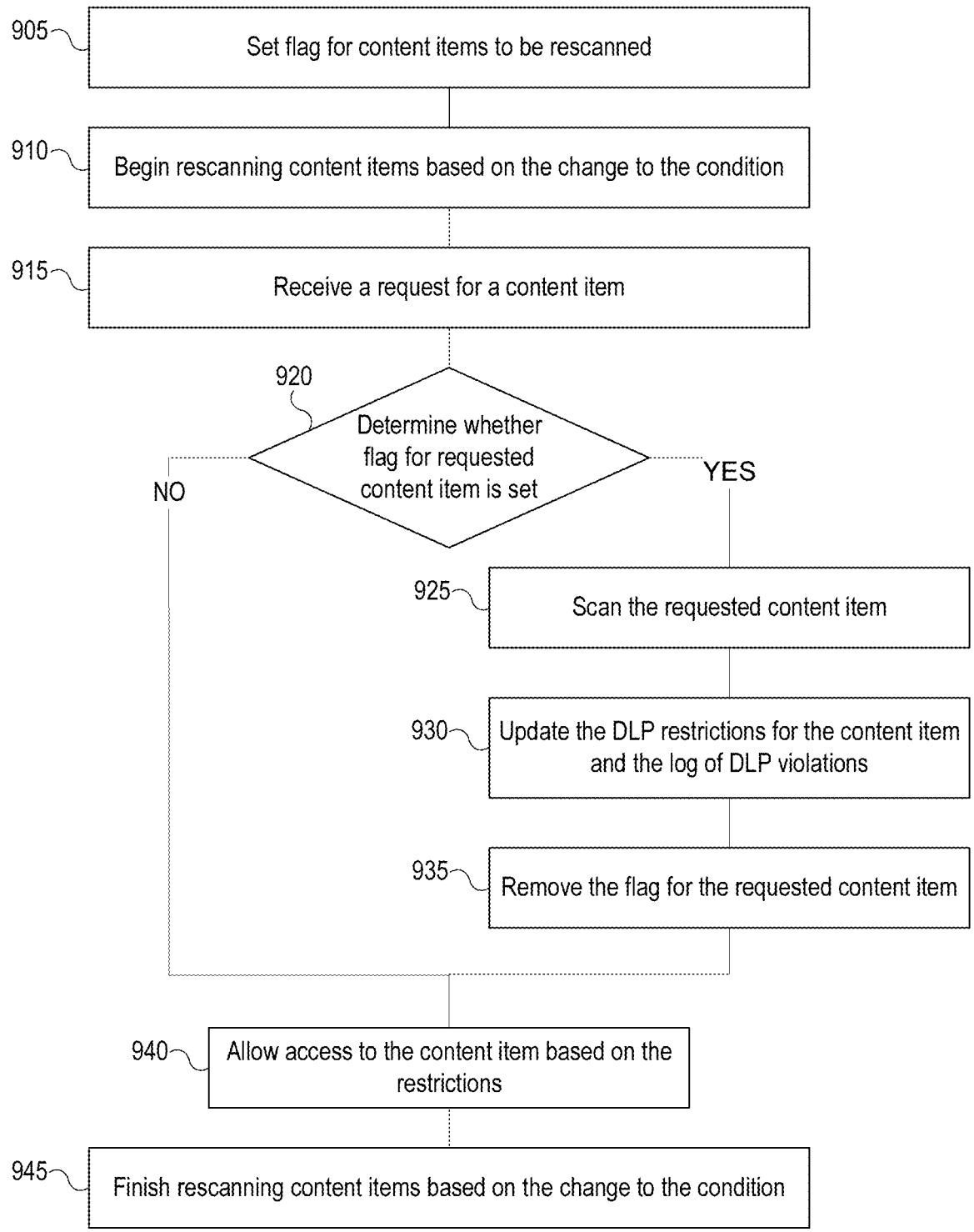
FIG. 9 shows an example method for responding to a change to a condition in a rule in a DLP policy according to some embodiments.

FIG. 9 shows an example method 900 for responding to a change to a condition in a rule in a DLP policy according to some embodiments. When a condition is changed in the DLP policy, rescanning of content items on the content management system 110 and updating the restrictions for the content items based on the scan may be appropriate. However, depending on the number of content items, the size of the content items, and the complexity of the scan, the rescanning and updating may not be completed for all content items before a user requests access to one of the content items. According to some embodiments, content management system 110 may use flags to indicate that DLP restrictions for some content items are not up to date.

For example, each content item entry may include a DLP outdated flag indicating whether the DLP restrictions for the content item is up to date. At operation 905, content management system 110 may set the DLP outdated flag for all content items that need to be rescanned and begin rescanning the content items based on the change to the condition in the DLP policy. Rescanning of the content items may include scanning the contents of each content item to determine whether the content item satisfies the changed condition, updating the restrictions for content items that satisfy the changed condition, and updating the log of DLP violations based on the scan. After a content item is scanned, content management system 110 may remove the DLP outdated flag to indicate that the DLP restrictions for the content item is up to date.

Before the rescanning of content items is completed at operation 945, content management system 110 may receive a request for a content item from a client device at operation 915. Content management system 110 determines whether the DLP outdated flag for the requested content item is set at operation 920. If the DLP outdated flag is not set, the DLP restrictions for the content item is up to date. Accordingly, method 900 continues to operation 940, where content management system 110 allows the client device access to the content item based on the existing restriction.

If the DLP outdated flag is set, the DLP restrictions for the content item is not current. Accordingly, content management system 110 scans the requested content item to determine whether the content item satisfies the changed condition at operation 925. The DLP restrictions for the requested content item are updated if the requested content item satisfies the changed condition and the log of DLP violations is updated based on the scan at operation 930. After a content item is rescanned, content management system 110 removes the DLP outdated flag at operation 935 to indicate that the DLP restrictions for the content item is up to date and allows the client device access to the content item at operation 940.

Returning to FIG. 7, at operation 740, content management system 110 determines whether the update to the rule was a change to a restriction in the rule. If so, the method continues in FIG. 10.

Figure 10:
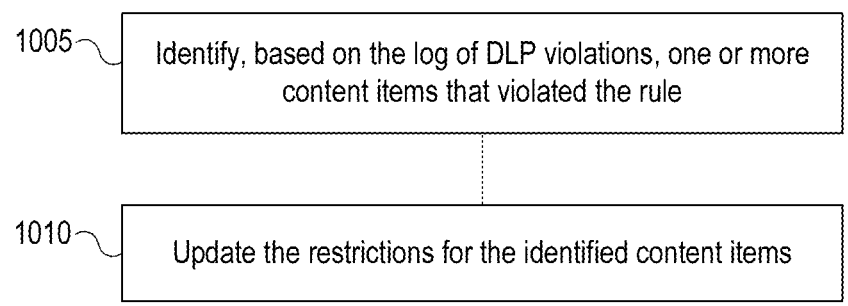
FIG. 10 shows an example method for responding to a change to a restriction in a rule in a DLP policy according to some embodiments.

FIG. 10 shows an example method 1000 for responding to a change to a restriction in a rule in a DLP policy according to some embodiments. In some embodiments, a change in the restrictions for a rule does not necessitate a rescanning of all content items. Instead, only the restrictions for content items that violated the rule should be updated based on the changed restrictions. Accordingly, content management system 110 may identify one or more content items that violated the rule based on the log of DLP violations at operation 1005. At operation 1010, the restrictions for the identified content items are updated based on the changed restriction.

Figure 11:
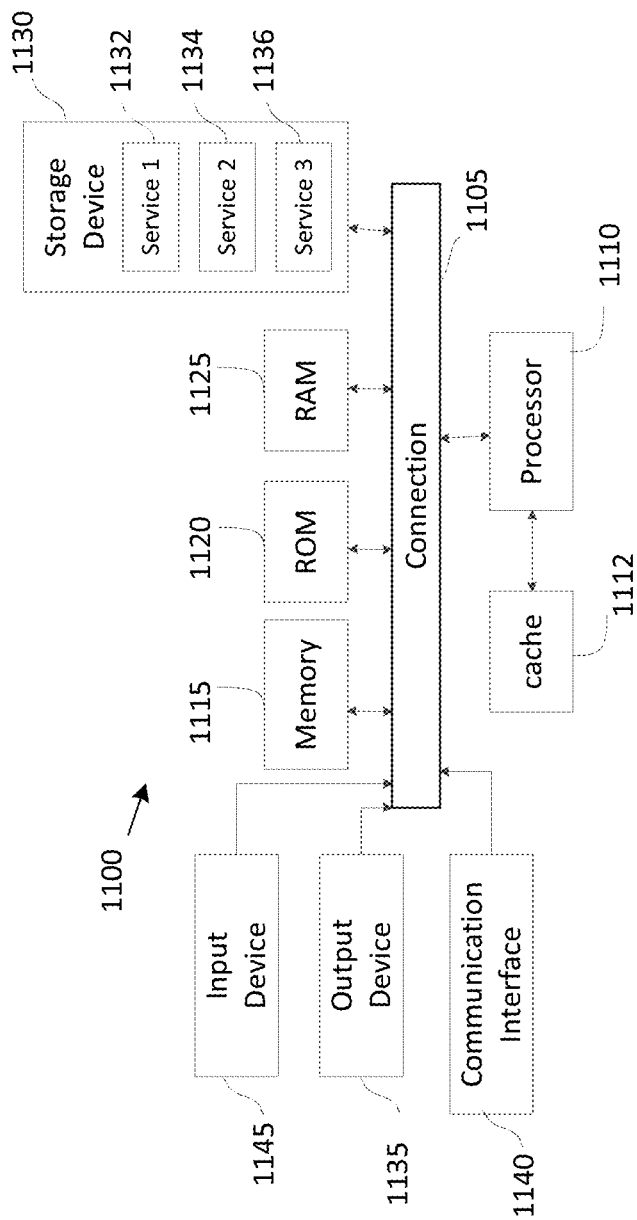
FIG. 11 shows an example of a system for implementing certain aspects of the present technology.

FIG. 11 illustrates an example computing system architecture 1100 wherein the components of the system are in communication with each other using a connection 1105. Connection 1105 can be a physical connection via a bus, or direct connection into processor 1110 such as in a chipset architecture. Connection 1105 can also be a virtual connection, networked connection, or logical connection.

In some embodiments, 1100 is a distributed system, wherein the functions described with respect to the components herein can be distributed within a datacenter, multiple datacenters, geographically, etc. In some embodiments, one or more of the described system components represents many such components each performing some or all of the function for which the component is described. In some embodiments, the components described herein can be physical or virtual devices.

Example system 1100 includes at least one processing unit (CPU or processor) 1110 and a connection 1105 that couples various system components including the system memory 1115, such as read only memory (ROM) and random access memory (RAM) to the processor 1110. The system 1100 can include a cache of high-speed memory connected directly with, in close proximity to, or integrated as part of the processor 1110.

The processor 1110 can include any general purpose processor and a hardware service or software service, such as service 1 1132, service 2 1134, and service 3 1136 stored in storage device 1130, configured to control the processor 1110 as well as a special-purpose processor where software instructions are incorporated into the actual processor design. The processor 1110 may essentially be a completely self-contained computing system, containing multiple cores or processors, a bus, memory controller, cache, etc. A multi-core processor may be symmetric or asymmetric.

To enable user interaction with the computing device 1100, an input device 1145 can represent any number of input mechanisms, such as a microphone for speech, a touch-sensitive screen for gesture or graphical input, keyboard, mouse, motion input, speech and so forth. An output device 1135 can also be one or more of a number of output mechanisms known to those of skill in the art. In some instances, multimodal systems can enable a user to provide multiple types of input to communicate with the computing device 1100. The communications interface 1140 can generally govern and manage the user input and system output. There is no restriction on operating on any particular hardware arrangement and therefore the basic features here may easily be substituted for improved hardware or firmware arrangements as they are developed.

Storage device 1130 can be a non-volatile memory and can be a hard disk or other types of computer readable media which can store data that are accessible by a computer, such as magnetic cassettes, flash memory cards, solid state memory devices, digital versatile disks, cartridges, random access memories (RAMs) 1125, read only memory (ROM) 1120, and hybrids thereof.

The storage device 1130 can include software services, servers, services, etc., that when the code that defines such software is executed by the processor 1110, it causes the system to perform a function. In some embodiments, a hardware service that performs a particular function can include the software component stored in a computer-readable medium in connection with the necessary hardware components, such as the processor 1110, bus 1105, display 1135, and so forth, to carry out the function.

For clarity of explanation, in some instances the present technology may be presented as including individual functional blocks including functional blocks comprising devices, device components, steps or routines in a method embodied in software, or combinations of hardware and software.

Any of the steps, operations, functions, or processes described herein may be performed or implemented by a combination of hardware and software services or services, alone or in combination with other devices. In some embodiments, a service can be software that resides in memory of a client device and/or one or more servers of a content management system and perform one or more functions when a processor executes the software associated with the service. In some embodiments, a service is a program, or a collection of programs that carry out a specific function. In some embodiments, a service can be considered a server. The memory can be a non-transitory computer-readable medium.

In some embodiments, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, solid state memory devices, flash memory, USB devices provided with non-volatile memory, networked storage devices, and so on.

Devices implementing methods according to these disclosures can comprise hardware, firmware and/or software, and can take any of a variety of form factors. Typical examples of such form factors include servers, laptops, smart phones, small form factor personal computers, personal digital assistants, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

What is claimed is:

1. A method comprising:
    performing a scan of a collection of content items stored on a content management system to determine if any content items are in violation of a rule of a data loss prevention (DLP) policy, wherein the rule comprises a condition and a restriction;
    updating content management permissions for one or more content items in violation of the rule;
    generating, based on the scan, a log of DLP violations, wherein each violation comprises a first reference to a content item in violation of the rule and a second reference to the rule that was violated;
    receiving an update to the rule in the DLP policy;
    identifying, based on the log of DLP violations, a content item for updating one or more content management permissions based on the update to the rule;
    updating the one or more content management permissions for the content item based on the update to the rule;
    receiving an access request based on a link to at least one content item stored on the content management system; and
    denying the access request based on content management permissions for the at least one content item,
    wherein performing the scan of the collection of content items comprises scanning content items stored in a content storage or scanning metadata associated with the content items, the metadata being stored in a metadata database, wherein the content storage is separate from the metadata database.

2. The method of claim 1, wherein the update to the rule comprises one of a removal of the rule from the DLP policy or a change in the restriction of the rule in the DLP policy.

3. The method of claim 1, wherein the restriction comprises at least one of a first limitation on downloading content items to a client device or a second limitation on sharing content items.

4. The method of claim 1, wherein the update to the rule is received from a client device associated with an administrator for a group of content management system users.

5. The method of claim 1, wherein the condition comprises a keyword or regular expression.

6. A non-transitory computer-readable medium comprising:
    instructions that, when executed by a computing system, cause the computing system to:
        perform a scan of a collection of content items stored on a content management system to determine if any content items are in violation of a rule of a data loss prevention (DLP) policy, wherein the rule comprises a condition and a restriction;
        update content management permissions for one or more content items in violation of the rule;
        generate, based on the scan, a log of DLP violations, wherein each violation comprises a first reference to a content item in violation of the rule and a second reference to the rule that was violated;
        receiving an update to the rule in the DLP policy;
        identify, based on the log of DLP violations, a content item for updating one or more content management permissions based on the update to the rule;
        update the one or more content management permissions for the content item based on the update to the rule;
        receive an access request based on a link to at least one content item stored on the content management system; and
        deny the access request based on content management permissions for the at least one content item, wherein performing the scan of the collection of content items comprises scanning content items stored in a content storage or scanning metadata associated with the content items, the metadata being stored in a metadata database, wherein the content storage is separate from the metadata database.

7. The non-transitory computer-readable medium of claim 6, wherein the update to the rule comprises one of a removal of the rule from the DLP policy or a change in the restriction of the rule in the DLP policy.

8. The non-transitory computer-readable medium of claim 6, wherein the restriction comprises at least one of a first limitation on downloading content items to a client device or a second limitation on sharing content items.

9. The non-transitory computer-readable medium of claim 6, wherein the update to the rule is received from a client device associated with an administrator for a group of content management system users.

10. The non-transitory computer readable medium of claim 6, wherein the condition comprises a keyword or regular expression.

11. A system comprising:
  a processor; and
  a non-transitory computer-readable medium storing instructions that, when executed by the system, cause the system to:
    perform a scan of a collection of content items stored on a content management system to determine if any content items are in violation of a rule of a data loss prevention (DLP) policy, wherein the rule comprises a condition and a restriction;
    update content management permissions for one or more content items in violation of the rule;
    generate, based on the scan, a log of DLP violations, wherein each violation comprises a first reference to a content item in violation of the rule and a second reference to the rule that was violated;
    receiving an update to the rule in the DLP policy;
    update, based on the update to the rule, one or more content management permissions associated with a content item identified based on the log of DLP violations;
    receive an access request based on a link to at least one content item stored on the content management system; and
    deny the access request based on content management permissions for the at least one content item,
    wherein performing the scan of the collection of content items comprises scanning content items stored in a content storage or scanning metadata associated with the content items, the metadata being stored in a metadata database, wherein the content storage is separate from the metadata database.

12. The system of claim 11, wherein the update to the rule comprises one of a removal of the rule from the DLP policy or a change in the restriction of the rule in the DLP policy.

13. The system of claim 11, wherein the restriction comprises at least one of a first limitation on downloading content items to a client device or a second limitation on sharing content items.

14. The system of claim 11, wherein the update to the rule is received from a client device associated with an administrator for a group of content management system users, and wherein the condition comprises a keyword or regular expression.

* * * * *